(12) United States Patent
Diosady et al.

(10) Patent No.: US 11,603,796 B2
(45) Date of Patent: Mar. 14, 2023

(54) TURBOFAN ENGINE AND METHOD OF OPERATING SAME

(71) Applicant: PRATT & WHITNEY CANADA CORP., Longueuil (CA)

(72) Inventors: Laslo Diosady, Etobicoke (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/344,185

(22) Filed: Jun. 10, 2021

(65) Prior Publication Data

US 2022/0397058 A1 Dec. 15, 2022

(51) Int. Cl.
| | | |
|---|---|---|
| *F02C 6/08* | (2006.01) | |
| *F02K 3/06* | (2006.01) | |
| *B64D 13/06* | (2006.01) | |
| *F02K 1/82* | (2006.01) | |
| *F02C 9/18* | (2006.01) | |

(52) U.S. Cl.
CPC ............... *F02C 6/08* (2013.01); *B64D 13/06* (2013.01); *F02C 9/18* (2013.01); *F02K 1/827* (2013.01); *F02K 3/06* (2013.01); *B64D 2013/0618* (2013.01); *F05D 2220/323* (2013.01); *F05D 2260/96* (2013.01)

(58) Field of Classification Search
CPC ..... B64D 2013/0603–0696; B64D 2033/0206; B64D 33/06; B64C 1/40; F02C 6/08; F02C 6/18; F02C 7/042–057; F02C 7/24; B60H 1/345; F15D 1/0045; F05D 2240/127; F05D 2260/2212–22141; F05D 2260/96–964; F05D 2260/99; F05D 2270/14; F02K 1/34; F02K 1/00–52; F02K 1/78–827; F02K 3/00–12; F02K 5/00–026; F02K 7/00–20; F02K 99/00; F28F 2250/02; F01D 5/045; F01D 5/10; F01D 5/16; F01D 5/22–24; F01D 5/26; F01D 25/04–06; F01D 25/164
See application file for complete search history.

(56) References Cited

U.S. PATENT DOCUMENTS

| | | | |
|---|---|---|---|
| 7,966,831 B2 * | 6/2011 | Kraft | F02K 3/06 60/785 |
| 3,024,935 A1 | 9/2011 | Hoover et al. | |
| 8,024,935 B2 * | 9/2011 | Hoover | F02K 3/06 60/785 |

(Continued)

FOREIGN PATENT DOCUMENTS

| | | | |
|---|---|---|---|
| EP | 2415992 | 2/2018 | |
| FR | 3003024 A1 * | 9/2014 | F02C 7/14 |

*Primary Examiner* — Stephanie Sebasco Cheng
(74) *Attorney, Agent, or Firm* — Norton Rose Fulbright Canada LLP

(57) ABSTRACT

The auxiliary duct can branch radially outwardly from the bypass duct, have a proximal end fluidly connecting the bypass duct and a distal end, a valve can be activatable to selectively open and close the auxiliary passage, and a structure can protrude partially from the auxiliary duct into the auxiliary passage, the structure spaced apart from the proximal end, between the proximal end and the valve, the structure generating lesser pressure losses when flow in the auxiliary passage is directed towards the distal end than when the flow is directed towards the proximal end.

13 Claims, 8 Drawing Sheets

(56) References Cited

U.S. PATENT DOCUMENTS

| | | | |
|---|---|---|---|
| 9,109,514 B2 * | 8/2015 | Cheong | F02C 6/08 |
| 10,487,744 B2 * | 11/2019 | Post | F02C 3/04 |
| 10,518,605 B2 * | 12/2019 | Molin | F02K 1/827 |
| 10,544,737 B2 | 1/2020 | Bowden et al. | |
| 10,823,055 B2 | 11/2020 | Joshi et al. | |

* cited by examiner

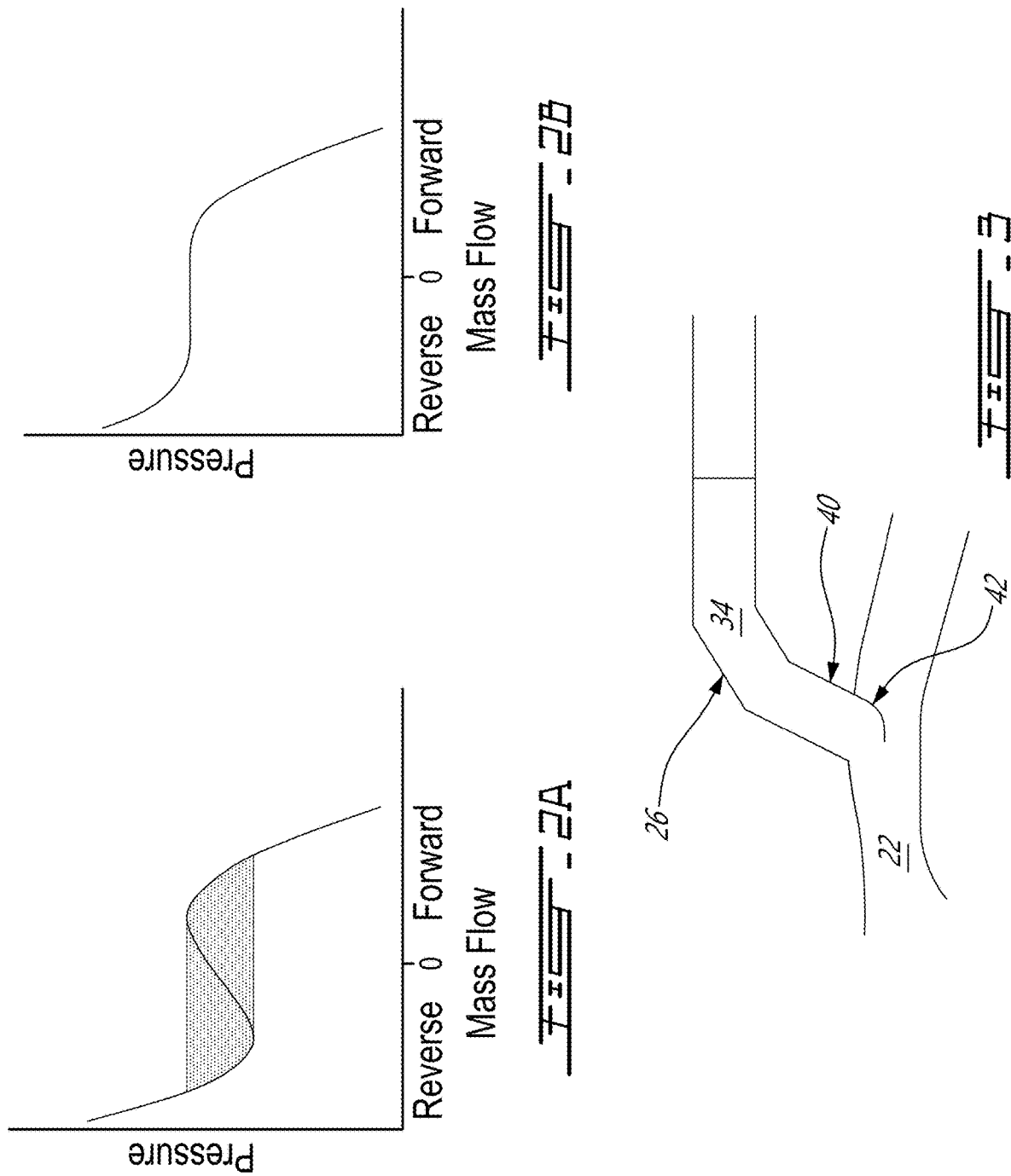

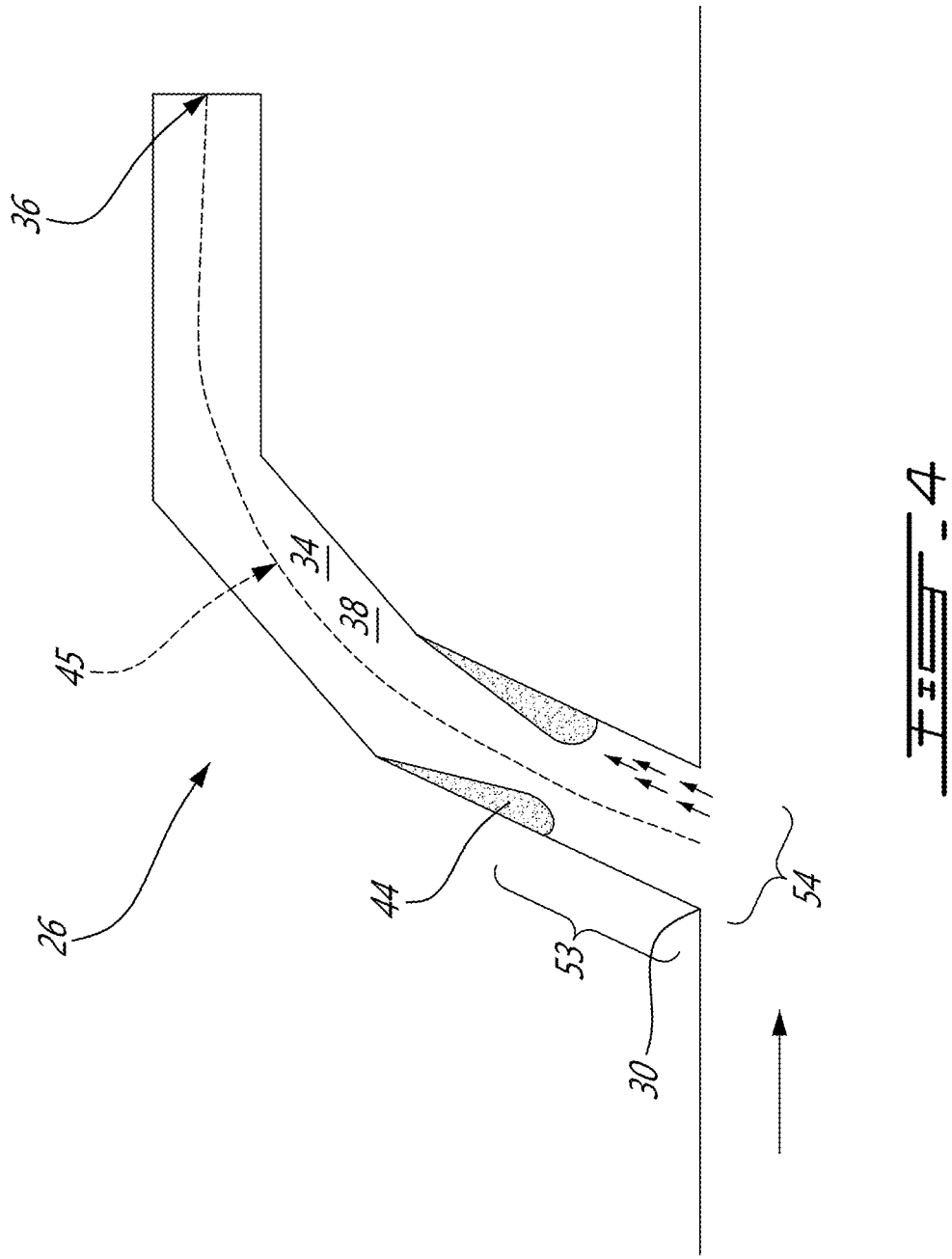

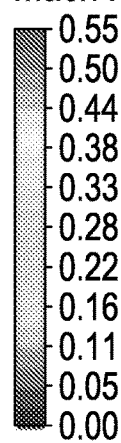
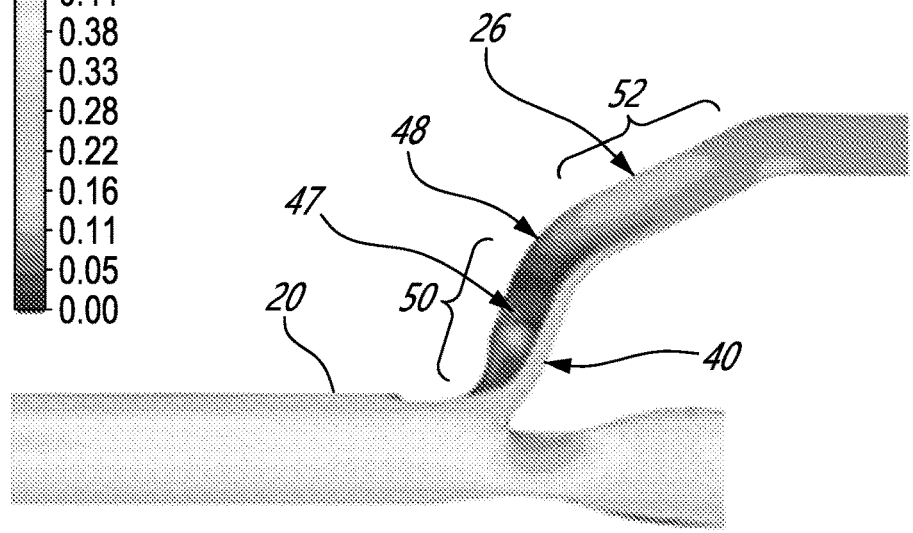
FIG. 5A
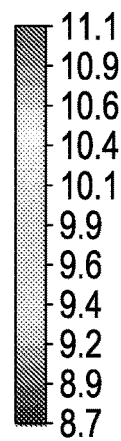
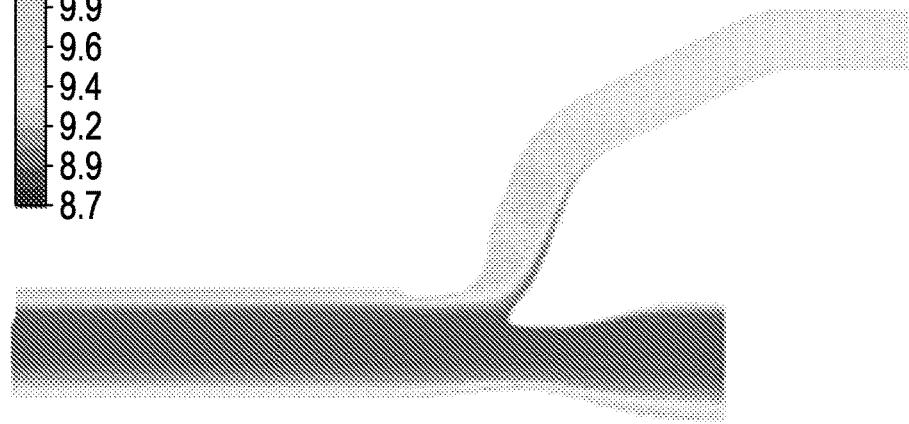
FIG. 5B

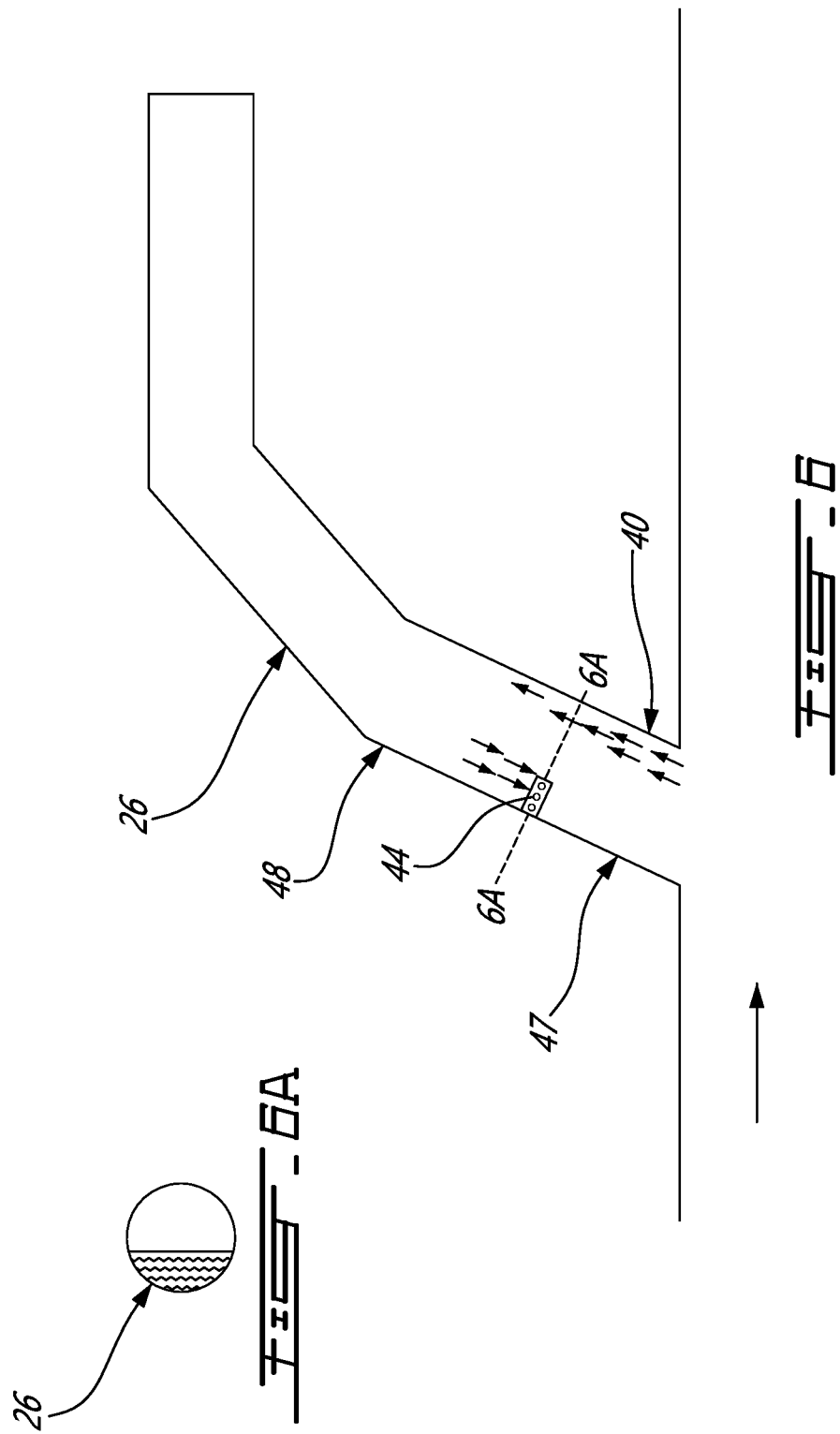

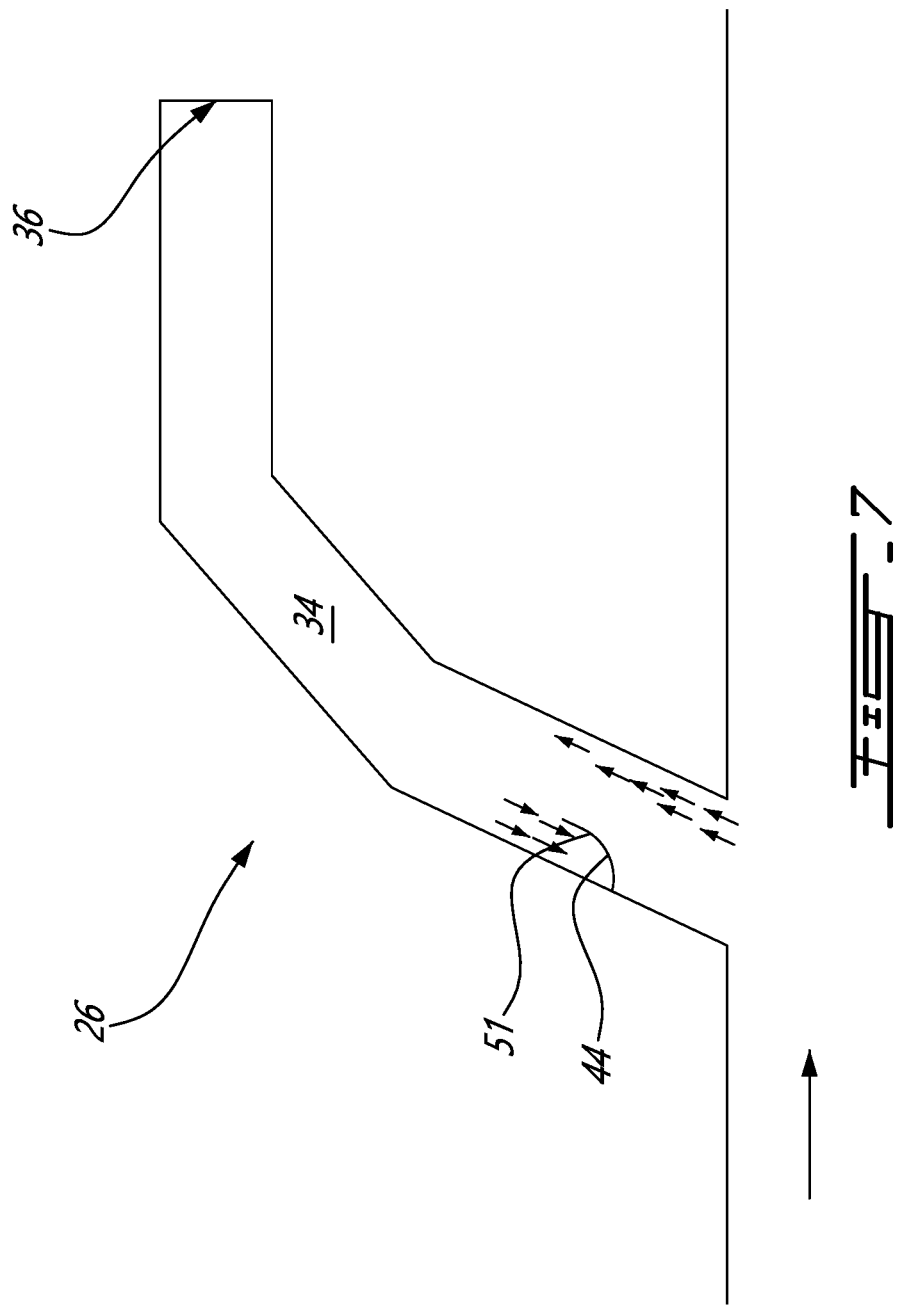

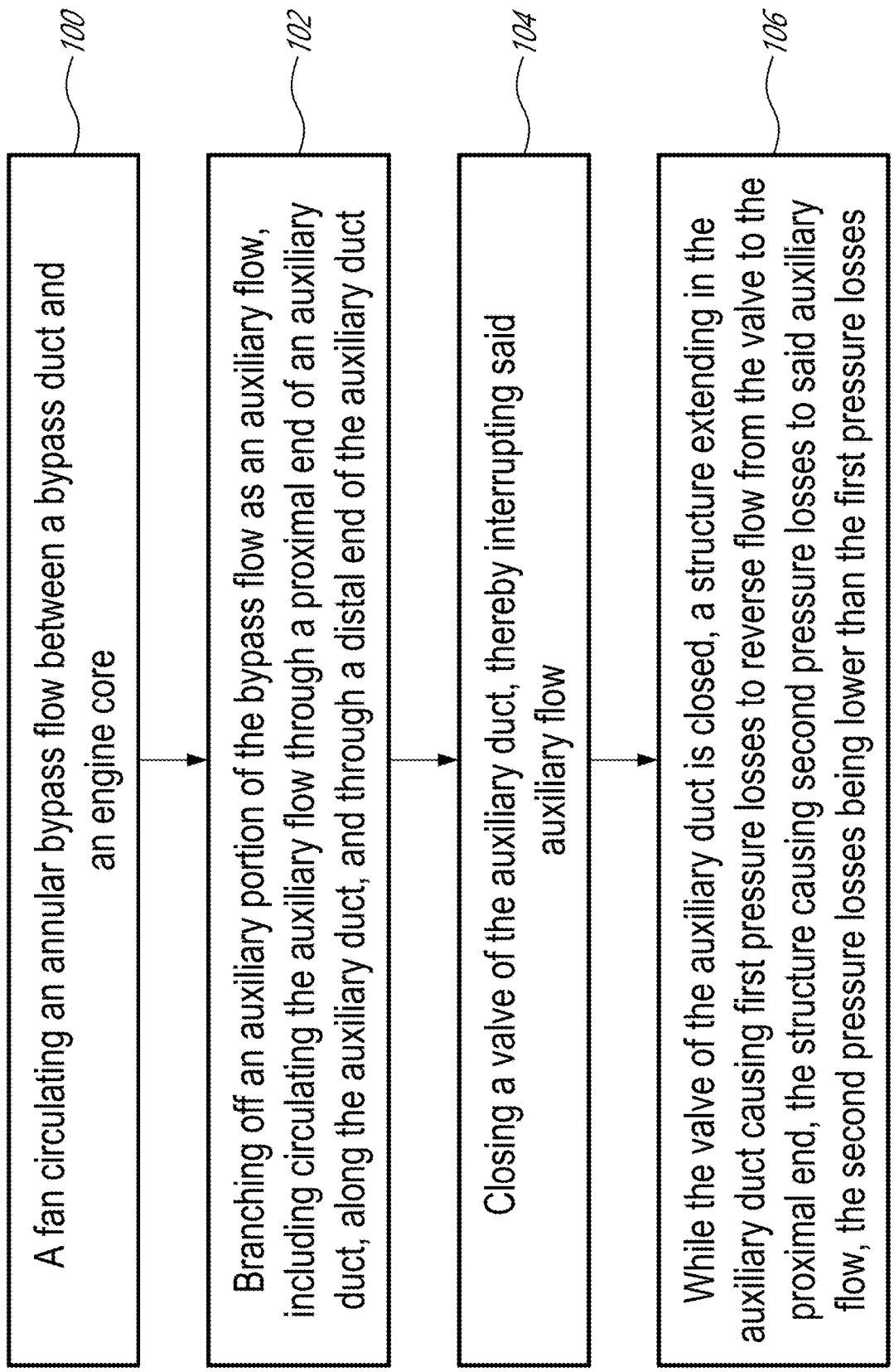

US 11,603,796 B2

TURBOFAN ENGINE AND METHOD OF OPERATING SAME

TECHNICAL FIELD

The application relates generally to gas turbine engines and, more particularly, to auxiliary ducts of turbofan engines.

BACKGROUND OF THE ART

Some turbofan engines have an auxiliary duct branching out from the bypass duct and configured to supply an aircraft system with a flow of pressurized air. The aircraft system can be a pre-cooler of an environment cooling system (ECS) for instance. In some cases, the auxiliary duct can be equipped with a valve to allow selectively opening or closing the auxiliary passage. When the valve is closed, a portion of the auxiliary duct open to the bypass flow can extend between the bypass duct and the valve. While existing auxiliary ducts were satisfactory to a certain degree, there always remains room for improvement.

SUMMARY

In one aspect, there is provided a turbofan engine comprising: a bypass duct forming a bypass passage extending annularly around an axis, the bypass passage extending rearwardly from a fan and around an engine core; an auxiliary duct branching radially outwardly from the bypass duct relative the axis, the auxiliary duct having a proximal end fluidly connecting the bypass duct and a distal end, the auxiliary duct defining an auxiliary passage between the proximal end and the distal end, the auxiliary passage fluidly connecting the bypass passage, a valve activatable to selectively open and close the auxiliary passage, and a structure protruding partially from the auxiliary duct into the auxiliary passage, the structure spaced apart from the proximal end, between the proximal end and the valve, the structure generating lesser pressure losses when flow in the auxiliary passage is directed towards the distal end than when the flow is directed towards the proximal end.

In another aspect, there is provided a method of operating a turbofan engine comprising: a fan circulating an annular bypass flow between a bypass duct and an engine core; branching off an auxiliary portion of a bypass flow as an auxiliary flow, including circulating the auxiliary flow through a proximal end of an auxiliary duct, along the auxiliary duct, and through a distal end of the auxiliary duct, closing a valve of the auxiliary duct, thereby interrupting said auxiliary flow, and while the valve of the auxiliary duct is closed, a structure extending in the auxiliary duct causing first pressure losses to reverse flow from the valve to the proximal end, the structure causing second pressure losses to said auxiliary flow, the second pressure losses being lower than the first pressure losses.

In a further aspect, there is provided an auxiliary duct system comprising: an auxiliary duct defining an auxiliary passage between a proximal end and a distal end, a valve activatable to selectively open and close the auxiliary passage, and a structure reducing the cross-sectional area of the auxiliary passage, the structure spaced apart from the proximal end, between the proximal end and the valve, the structure generating lesser pressure losses when flow in the auxiliary passage is directed towards the distal end than when the flow is directed towards the proximal end.

DESCRIPTION OF THE DRAWINGS

Reference is now made to the accompanying figures in which:

FIGS. 2A and 2B are diagrams of pressure vs. mass flow for two different auxiliary duct configurations;

FIG. 3 is a schematic cross-sectional view of an example auxiliary duct configuration;

FIG. 4 is a schematic cross-sectional view of another example auxiliary duct configuration;

FIGS. 5A-5D are graphs mapping speed (5A, 5C) and pressure (5B, 5D) of forward flow (5A, 5B) and reverse flow (5C, 5D) in accordance with one example auxiliary duct configuration;

FIG. 6 is a schematic cross-sectional view of another example auxiliary duct configuration, with FIG. 6A being a cross-sectional view taken along lines 6A-6A of FIG. 6;

FIG. 7 is a schematic cross-sectional view of another example auxiliary duct configuration, and FIG. 8 is a flow chart of a method of operating a turbofan engine in accordance with an embodiment.

DETAILED DESCRIPTION

Figure 1:
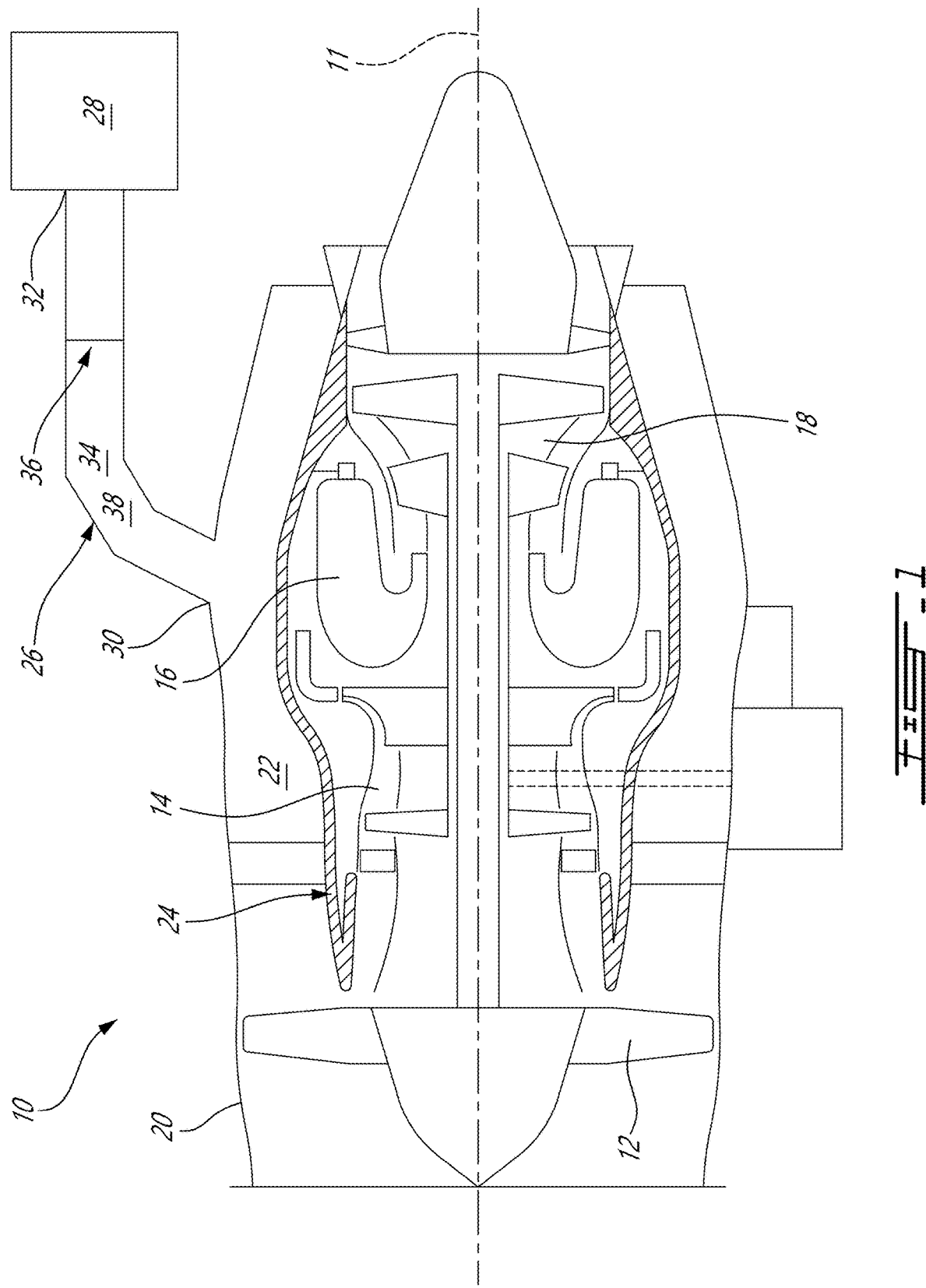
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases. The gas turbine engine 10 is of the turbofan type, and therefore has an annular bypass duct 20. The bypass duct delimits a bypass passage 22 extending annularly around a the axis 11. A forward and a rear directions can be defined along the axis 11. The bypass passage 22 extends rearwardly from the fan 12 around and along an engine core 24. A first portion of the flow from the fan 12 is directed to the engine core 24 as a working fluid for the turbine section 18, and a second portion of the flow from the fan 12 is directed to the bypass passage 22 in the form of a bypass flow, for thrust.

In some embodiments, it can be required to provide the gas turbine engine 10 with an auxiliary duct 26 which branches off from the bypass duct 20. Such an auxiliary duct 26 can serve to supply pressurized air to an aircraft system 28 such as an environmental cooling system (ECS) pre-cooler, or any other suitable aircraft system, for instance. The auxiliary duct 26 can have a proximal end 30 fluidly connecting the bypass duct 20, and a distal end 32 which can directly or indirectly connect to the aircraft system 28. The auxiliary duct 26 forms an auxiliary passage 34 from the proximal end 30 to the distal end 32, the auxiliary passage 34 being fluidly connected to the bypass passage 22 at the proximal end 30.

Depending on the embodiment, the amount of air to be supplied via the auxiliary passage 34 may need to be substantial. This auxiliary flow may be subject to various pressure losses or aerodynamic transformations which make it lose some or all of its efficiency from the point of view of propulsion. The circulation of air through the auxiliary duct 26 can thus be associated to a trade-off of loss in engine efficiency. The aircraft system 28 may not be continuously in operation, or may not continuously require the supply of auxiliary air. While the loss in engine efficiency may be considered a suitable trade-off during operation of the aircraft system 28, the loss may be more undesirable when the auxiliary air is not required by the aircraft system 28.

To mitigate such undesired losses of engine efficiency, a valve 36 can be provided in the auxiliary duct 26 and used to selectively open or close the auxiliary passage 34 as a function of the auxiliary air requirements of the aircraft system 28. For various reasons, it may not be feasible or otherwise suitable to position the valve directly at the proximal end 30. In such cases, the valve 36 is positioned at the distal end 32, or at an intermediate location along the length of the auxiliary passage 34, between the proximal end 30 and the distal end 32. In such cases, a portion of the auxiliary duct 26 extending between the proximal end 30 and the valve 36 can form a cavity 38 which is in fluid communication with the bypass passage 22 when the valve is closed.

Such a configuration can help in successfully mitigating undesired losses by preventing or significantly limiting the flow of auxiliary air through the auxiliary duct 26, forcing it instead into the downstream portion of the bypass passage 22 where it can serve for thrust. However, the presence of the cavity 38 may not be ideal from an dynamic perspective. In particular, such an elongated cavity 38 can have one or more resonance frequencies, such as a natural frequency and harmonics thereof, with the pressurized air medium, and the highly dynamic flow of air in the bypass duct 22 adjacent the proximal end 30 can represent a driving excitation for the resonance frequency. High energy air vibrations at the resonance frequency(ies) associated to variations of flow and of air pressure in the cavity 38 can be an undesired source of noise, or even of potential structural failure.

The interface between the auxiliary duct 26 and the bypass duct 20 can be configured in a manner that some dynamic pressure recovery from the bypass passage 22 occurs when the valve 36 is open. A typical curve of the pressure in the auxiliary duct 26 as a function of the mass flow circulating through it is depicted in FIG. 2A. Large forward flow is achieved when there is low back pressure, while large back pressure is required in order to reverse the flow. In an embodiment, a source of the resonance can be attributed to the sideways "s"-shape of the curve near zero flow, where for small forward flow larger pressure is seen in the auxiliary duct as there is some dynamic pressure recovery, while to drive flow in the reverse direction only sufficient pressure to overcome the static pressure in the bypass passage is required. When the valve is closed, a hysteresis can develop corresponding red-highlighted area in the curve which can lead to large intensity acoustic tones.

To eliminate the acoustic resonance it can be desired to modify the shape of the pressure curve such as to reduce or eliminate possibility of hysteresis as depicted in the curve in FIG. 2B.

The more the interface between the auxiliary passage 26 and the bypass passage 20 at the proximal end 30 is optimized from the point of view of pressure recovery, the greater the tendency to generate large acoustic tones may be. For instance, an example auxiliary passage shape is shown in FIG. 3 where the rear portion 40 of the auxiliary duct 26 penetrates radially to a certain extent into the bypass passage 22 forming a scoop 42 which redirects a portion of the axially incoming bypass flow into the radially outward orientation of a first section of the auxiliary passage 34. Indeed, in this embodiment, to achieve sufficient flow, the scoop 42 is designed to reduce the pressure losses entering the auxiliary duct 26 and to recover some dynamic pressure from the bypass flow. Accordingly, circulating the auxiliary portion of the bypass flow through a curvilinear scoop 42 having a forward facing inlet (facing the fan 12) can preserve flow momentum from the bypass flow in a first section of the auxiliary duct 26.

In one embodiment, it can be desired to address the occurrences of resonances by perturbing the flow near the proximal end 30. Such an approach can consist of introducing a fence or a louver directly at the proximal end 30 of the auxiliary duct 26, at the inlet. Such an approach may have a suitable effect from the point of view of avoiding large intensity acoustic tones, but may, however, be detrimental from the point of view of pressure recovery when the valve 36 is open. Accordingly, such an approach may impede flow rate momentum through the auxiliary duct 26 in situations where momentum through the auxiliary duct 26 is preferably optimized. Such an approach may thus leave a want for improvement from the point of view of dynamic pressure recovery.

It was conceived that introducing a structure 44 which generates asymmetrical losses to the circulation of air in the auxiliary duct 26, and more specifically a greater loss in the reverse flow orientation (towards the proximal end 30) than in the forward flow orientation (towards the valve 36 or distal end 32) along the auxiliary passage 34, could be better than the previous approach. Indeed, such an approach can be optimized to limit losses in the forward flow orientation (i.e. from the proximal end 30 to the aircraft system 28), which favors pressure recovery and momentum when the valve 36 is open, while increasing losses/impeding circulation in the reverse orientation (i.e. back to the proximal end 30 from the valve 36), thus avoiding, or mitigating, the formation of a high energy resonance when the valve 36 is closed.

FIG. 4 presents an example of such a structure 44. More specifically, the structure 44 protrudes partially from the auxiliary duct 26 into the auxiliary passage 34, and in other words, restricts the cross-sectional area of the auxiliary passage 34. The structure 44 can be located at an intermediate position between the proximal end 30 and the valve 36. In other words, it can be spaced apart from both the proximal end 30 and from the valve 36 along the length 45 of the cavity 38. In the embodiment presented in FIG. 4, the structure 44 can be a Venturi-type structure extending axisymmetrically around a central axis or centerline of the auxiliary passage 34, and presenting a greater pressure loss to reverse flow than to forward flow along the auxiliary passage 34. It will be understood that other aerodynamic structures may lead to suitable effects and even be preferred in other embodiments. Moreover, the shape of the auxiliary passage 34 can vary in alternate embodiments. For instance, the auxiliary passage 34 can be straight instead of curvilinear in an alternate embodiment, and a Venturi-type structure provided within a straight passage can operate similarly to the one illustrated in FIG. 4.

Figure 5C:
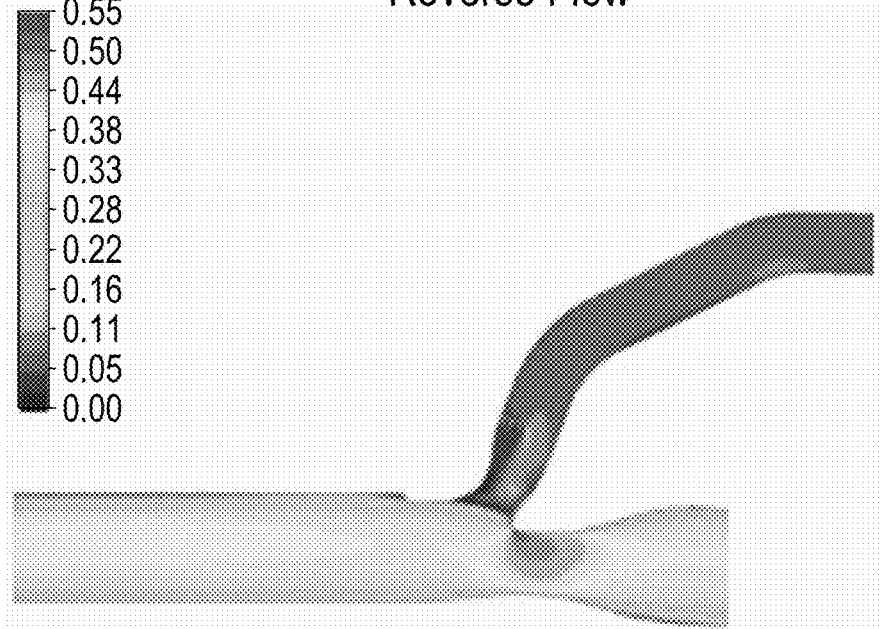

In some embodiments, the configuration of the auxiliary passage 34 relative to the bypass passage 22 may impart asymmetric features to the flow of air in the air passage 34 when the valve 36 is open. This can be the case, for instance, in the embodiment presented in FIGS. 5A to 5D. FIGS. 5A and 5B, in particular, show characteristics of the flow which can occur in typical operating conditions when the valve 36 is open. Given the fact that the auxiliary duct 26 branches off from the bypass duct 20 radially outwardly, a change in the traveling direction of the fluid, the pressurized air, occurs when the air traverses the inlet/proximal end 30 and circulates inside the first section of the duct. Such a change in flow orientation causes an asymmetry to the flow which can be seen in FIGS. 5A and 5B. Indeed, the speed and pressure of the fluid immediately downstream of the proximal end is significantly greater alongside the rear portion 40 of the auxiliary passage 26 than along the front portion 47 of the auxiliary passage 26. In the reverse flow orientation (FIGS. 5C, 5D), however, such asymmetry may be absent, or even reversed. Indeed, in a scenario such as the one illustrated, where an oppositely oriented elbow 48 is defined between a first section 50 of the auxiliary duct 26 and a second section 52. Indeed, in the illustrated embodiment, air progressing in the reverse direction will become pressed against the forward portion 46 of the auxiliary duct 26 rather than the rear portion 40 as it exits the elbow 48. Indeed, in an embodiment such as illustrated FIG. 5A, circulating the auxiliary flow through a curvilinear elbow 48 between the first section 50 and a second section 52 redirects the flow towards an axial orientation, and circulating the flow in the reverse orientation through the same area redirects the flow towards a radially-inward orientation.

In a scenario such as the one illustrated, when the flow characteristics are not the same in the forward and the reverse directions, introducing a structure 44 which would have a symmetrical effect on a uniform flow may have a suitable asymmetrical effect given the differing flow configurations in the opposite flow orientations. Accordingly, such a concept can be harnessed to provide greater pressure losses in the reverse orientation than in the forward orientation.

Figure 5D:
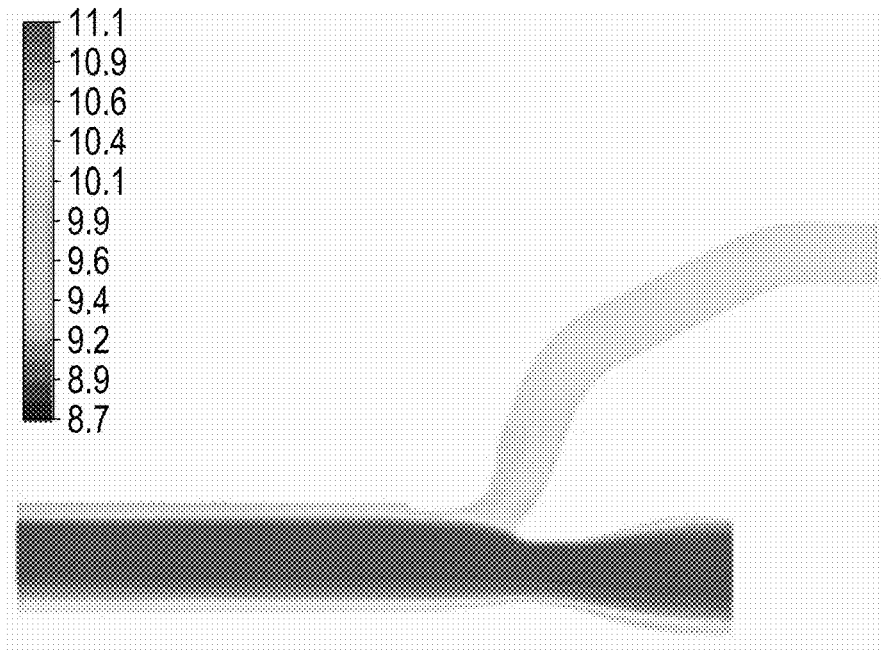

An example of an embodiment harnessing this concept is illustrated in FIG. 6. In the embodiment presented in FIG. 6, a structure 44 is introduced in the form of a perforated plate which protrudes partially into the auxiliary passage 34 from the front portion 47 of the auxiliary duct 26, such as presented in section A-A. Occupying the front portion 47 of the auxiliary duct 26 in a region where the forward flow is strongly compressed against the rear portion 40 (as best seen in FIGS. 5A and 5B), the structure has a limited effect on the forward flow. The forward flow essentially "slips" under the structure. However, it has a significant effect on the rearward flow (as best seen in FIGS. 5C and 5D) which is compressed against the front portion 47 of the auxiliary duct as it exits the elbow 48. Sufficient energy can be dissipated by the perforated baffle as the flow exits in the reverse direction to reduce or eliminate the acoustic resonance.

The example of a perforated plate is but one of many possible alternative configurations. For instance, an embodiment presented in FIG. 7 can use a structure 44 in the form of a louver 51 or a set of louvers to achieve a very similar aerodynamic effect. In FIG. 7, the louver 51 extends obliquely into the auxiliary duct 26 leading to a progressively reducing surface area towards the valve 36, along a given section of the auxiliary duct 26. In other words, the louver 51 penetrates progressively deeper into the auxiliary passage 34 from the front portion 47 as it progresses the direction of the distal end or valve 36.

Each of the embodiments presented in FIG. 4, FIG. 6 and FIG. 7 use a structure 44 which generates asymmetric pressure losses to air flow depending on the orientation of the air flow. The embodiment presented in FIG. 4 intrinsically produces asymmetric pressure losses, and can work on a straight duct having uniform flow. The embodiments presented in FIGS. 6 and 7 use a structure 44 which is structurally asymmetrical relative to a central axis 46 of the auxiliary duct 26, and which harnesses an asymmetry in the flow stemming from the irregular shape of the auxiliary duct 26 or of the flow within it such as which can stem from the configuration of the auxiliary passage 26 relative to the bypass passage 22 to impart asymmetric pressure losses in the different orientations. More specifically, in these embodiments, the asymmetry in both orientations of the flow in the portion of the auxiliary duct 26 bearing the structure 44 stems from the pressing of the forward flow and from the pressing of the rearward flow against opposite portions (forward or rearward) given the turning of the flow generated by the scoop 42 and by the elbow 48. More specifically, all these embodiments generate lesser pressure losses to air flowing towards the distal end 32 than pressure losses to air flowing towards the proximal end 30.

In all the embodiments presented above, as evidenced in FIG. 4 for instance, the structure 44 generating the asymmetric pressure losses is not located at the proximal end 30, but recessed therefrom into the auxiliary passage 34. A first distance 53 between the structure 44 and the proximal end 30 of the auxiliary duct 26 can be of more than half of a cross-sectional dimension 54 of the air passage 34 at the proximal end 30. The cross-sectional dimension 54 can be a diameter of the air passage at the proximal end 30 if the cross-sectional shape is circular. If the cross-sectional shape is non-circular, the cross-sectional dimension 54 can be a major dimension of the non-circular shape, a minor dimension of the non-circular shape, or an average between the two. The distance 53 between the structure 44 and the proximal end 30 of the auxiliary duct 26 can be of more than the entire cross-sectional dimension 54 of the air passage 34 at the proximal end 30, or even more in other embodiments.

Referring to FIG. 8, a method of operation can include a fan circulating 100 an annular bypass flow between a bypass duct 20 and an engine core 24, branching off 102 an auxiliary portion of the bypass flow as an auxiliary flow, including circulating the auxiliary flow through a proximal end 30 of an auxiliary duct 26, along the auxiliary duct 26, and through a distal end 32 of the auxiliary duct 26, closing 104 a valve 36 of the auxiliary duct 26, thereby interrupting said auxiliary flow, and while the valve of the auxiliary duct 26 is closed, a structure 44 extending in the auxiliary duct 26 causing 106 first pressure losses to reverse flow from the valve 36 to the proximal end 30, the structure causing second pressure losses to said auxiliary flow, the second pressure losses being lower than the first pressure losses, preferably 25% lower or more. The presence of the structure can impede acoustic resonances at a natural frequency cavity 38 formed by the auxiliary duct 26 between the proximal end 30 and the valve 36 when the valve 36 is closed.

In some embodiments, it can be preferred to avoid inducing not only resonances at a natural frequency of the cavity 38, but also secondary resonances, which may be considered as "harmonics". This can be achieved in some embodiments by the choice of location at which the structure 44 is placed along the length 45 of the cavity 38. Indeed, positioning the structure at exactly half of the length 45 of the cavity 38 (the cavity 38 being is the "acoustically active" portion of the auxiliary duct 26 extending between the proximal end 30 and the valve 36 when the valve 36 is closed) may successfully impede resonance at the natural frequency, while allowing relatively strong harmonics at twice the natural frequency or at other higher frequencies. It can be desired to strategically position the structure at a location where it will impede all significant resonances, which can be referred to as resonances occurring at frequencies of interest. Positioning the structure 44 relatively close to the proximal end 30, while maintaining the structure spaced from the proximal end 30 by at least half the cross-sectional dimension 54 of the auxiliary duct 26, may be one way to achieve this in some embodiments. In particular, in an embodiment such as shown in FIGS. 5A and 5B, where a low velocity "bubble" is formed alongside the front portion 46 of the auxiliary duct 26 downstream of the proximal end 30, it can be strategic to position the structure 44 within that area of forward flow low-velocity bubble. In most embodiments, it will be preferred for the distance 53 between the structure 44 and the proximal end 30 to be at least than 10%, preferably at least 20%, preferably at least 30% more or less than the length 45 of the cavity 38 or distance between the proximal end 30 and the valve 36. To avoid higher energy harmonics, it can be preferred to position the structure at an irrational fraction of the length 45 of the cavity 38. It can also be preferred to position the structure 44 closer to the proximal end 30 than to the valve 36 in some embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the internal structures can be customized to non-circular ducts, the internal structures may be made of smart materials and may be intrinsically activated in response to specific flow parameters or topology, the internal structures may be machined, welded/brazed, moulded or 3D printed into the hosting duct. Yet further modifications could be implemented by a person of ordinary skill in the art in view of the present disclosure, which modifications would be within the scope of the present technology.

The invention claimed is:

1. A turbofan engine comprising:
a bypass duct forming a bypass passage extending annularly around an axis, the bypass passage extending rearwardly from a fan and around an engine core;
an auxiliary duct branching radially outwardly from the bypass duct relative to the axis, the auxiliary duct having a proximal end fluidly connecting the bypass duct and a distal end, the auxiliary duct defining an auxiliary passage between the proximal end and the distal end, the auxiliary passage fluidly connecting to the bypass passage,
a valve activatable to selectively open and close the auxiliary passage, and
a static structure protruding partially from the auxiliary duct into the auxiliary passage, the structure spaced apart from the proximal end, between the proximal end and the valve, the structure generating lesser pressure losses when flow in the auxiliary passage is directed towards the distal end than when the flow is directed towards the proximal end.

2. The turbofan engine of claim 1 wherein a distance between the structure and the proximal end is greater than half of a cross-sectional dimension of the auxiliary passage at the proximal end.

3. The turbofan engine of claim 2 wherein the distance is greater than the cross-sectional dimension.

4. The turbofan engine of claim 1 wherein a first distance defined between the proximal end and the structure is at least 10% more than or 10% less than half of a second distance defined between the proximal end and the valve, along a length of the auxiliary passage.

5. The turbofan engine of claim 4 wherein the first distance is at least 20% more than or 20% less than half of the second distance.

6. The turbofan engine of claim 5 wherein the first distance is at least 30% more than or 30% less than half of the second distance.

7. The turbofan engine of claim 1 wherein the auxiliary duct has a first section extending radially outwardly from the proximal end, a second section extending axially towards the distal end, and an elbow between the first section and the second section.

8. The turbofan engine of claim 7 wherein the structure protrudes from a forward portion of the auxiliary duct, the structure in the first section and partially obstructing the flow.

9. The turbofan engine of claim 8 wherein the structure is an apertured plate extending transversally to a longitudinal extent of the auxiliary passage.

10. The turbofan engine of claim 8 wherein the structure is a louver extending progressively deeper into the auxiliary duct in a direction towards the distal end.

11. The turbofan engine of claim 1 wherein the auxiliary duct has a scoop at the proximal end, the scoop penetrating into the bypass passage, having an inlet oriented forwardly towards the fan.

12. The turbofan engine of claim 1 wherein the pressure losses when flow is directed towards the distal end are at least 25% lesser than when flow is directed towards the proximal end.

13. The turbofan engine of claim 1 wherein the distal end is fluidly connected to an environmental control system pre-cooler.

* * * * *